United States Patent
Yamamoto et al.

(10) Patent No.: US 6,471,874 B2
(45) Date of Patent: Oct. 29, 2002

(54) EFFLUENT TREATING METHOD, AN EFFLUENT TREATING APPARATUS, AND A CLEANING APPARATUS USING THE SAME

(75) Inventors: Jun Yamamoto, Hamamatsu (JP); Akira Osawa, Hamamatsu (JP); Kunimasa Muroi, Hamamatsu (JP); Yoichi Nagasaki, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 09/825,001

(22) Filed: Apr. 3, 2001

(65) Prior Publication Data

US 2001/0037980 A1 Nov. 8, 2001

(30) Foreign Application Priority Data

Apr. 7, 2000 (JP) .......................... 2000-107141
Oct. 4, 2000 (JP) .......................... 2000-305316

(51) Int. Cl.[7] .......................... C02F 1/32; B01D 19/00
(52) U.S. Cl. .................. 210/748; 210/177; 210/202; 210/221.2; 210/259; 210/502.1
(58) Field of Search ................. 210/661, 663, 210/748, 758, 763, 750, 177, 178, 201, 202, 219, 221.2, 259, 418, 501, 502.1; 423/213.2, 245.1

(56) References Cited

U.S. PATENT DOCUMENTS

| 4,406,796 | A | * | 9/1983 | Duval |
| 4,861,484 | A | * | 8/1989 | Lichtin et al. |
| 5,045,214 | A | * | 9/1991 | Walker |
| 5,045,288 | A | * | 9/1991 | Raupp et al. |
| 5,096,871 | A | * | 3/1992 | Lever et al. |
| 5,330,661 | A | * | 7/1994 | Okuda et al. |
| 5,480,524 | A | * | 1/1996 | Oeste |
| 5,501,801 | A | * | 3/1996 | Zhang et al. |
| 5,541,096 | A | * | 7/1996 | Nomura et al. |
| 5,545,316 | A | * | 8/1996 | Kazama et al. |
| 5,547,823 | A | * | 8/1996 | Murasawa et al. |
| 6,001,258 | A | * | 12/1999 | Sluys et al. |
| 6,221,259 | B1 | * | 4/2001 | Kittrell |

FOREIGN PATENT DOCUMENTS

| JP | 8-323346 | | 12/1996 |
| JP | 11-47771 | * | 2/1999 |

* cited by examiner

*Primary Examiner*—David A. Simmons
*Assistant Examiner*—Fred Prince
(74) *Attorney, Agent, or Firm*—Dickstein, Shapiro, Morin & Oshinsky LLP (57) ABSTRACT

An effluent treating method, comprising the steps of: vaporizing effluent containing chlorine-based organic matter and producing vaporized gas containing chlorine-based organic gas; reacting said vaporized gas with photocatalytic material, with irradiating ultraviolet light, and decomposing the vaporized gas; and absorbing, adsorbing, or neutralizing the reacting step. The treatment is therefore efficiently conducted and discharge of secondary products such as chlorine-based gas can be suppressed.

18 Claims, 7 Drawing Sheets

EFFLUENT TREATING METHOD, AN EFFLUENT TREATING APPARATUS, AND A CLEANING APPARATUS USING THE SAME

This application is based on Japanese Patent Applications 2000-107141 filed on Apr. 7, 2000 and 2000-305316 filed on Oct. 4, 2000, all the content of these applications is incorporated herein by reference.

BACKGROUND OF THE INVENTION

1. Field of the Invention

The present invention relates to an effluent treating technology to decompose and to remove chlorine-based organic matter contained in effluent, and in particular, to an effluent treating technology capable of treating effluent with high efficiency and suppressing discharge of secondary products such as chlorine-based gas.

2. Description of the Related Art

Chlorine-based organic solvents have high cleaning capability, high stability, and incombustibility and have been therefore well known as good cleaning agents.

According to the Atmospheric Contamination Prevention Law, chlorine-based organic matter has been recently designated as priority substance, voluntary control substance, and designated substance among the hazardous air contaminating substance. Quantity of chlorine-based organic matter contained in effluent and exhaust gas from a cleaning apparatus of a dry-cleaning system and the like must be decreased not to exceed limit values as the effluent standards. For this purpose, an adsorbing method using activated carbon, a thermal vaporizing method, and the like have been heretofore employed.

In the adsorbing method using activated carbon, since the activated carbon loses the adsorbing function at its saturated stage of adsorbtion, the activated carbon must be replaced at this stage. However, it is difficult to detect a point in time when the activated carbon loses the adsorbing function. Additionally, it is necessary to entrust treatment of the saturated activated carbon as a designated substance to a specialized plant or company or it is neccessary to desorb the saturated activated carbon by steam or the like before the activated carbon is used again. However, these procedures have low efficiency and require additional cost.

When the thermal vaporizing method is used, concentration of chlorine-based matter in the effluent can be lowered down to a standard value designated by the law or less by vaporizing the chlorine-based matter.

In the method, however, when the chlorine-based matter has a low concentration in the effluent, the treatment cannot be fully effectively conducted and hence treatment efficiency is lowered. Vaporized chlorine-based organic matter not decomposed is discharged into air. Therefore, quantity of chlorine-based organic matter contained in the discharge gas cannot be lowered to the limit as the effluent standard in some cases.

Recently, there has been proposed, for example, in JP-A-8-323346 an effluent treating technology employing a photocatalytic material which is activated at an ultraviolet-ray level of natural sun light or fluorescent light and which thereby decomposes chlorine-based organic solvent and the like to render the solvent harmless.

The technology however is attended with a problem that no consideration has been given to a point to render harmless the chlorine-based gas produced as a result of decomposition of chlorine-based organic matter.

Since the regulation of exhaust of chlorine-based organic matter is getting severer these days, an effluent treating technology having high decomposing efficiency has been needed.

SUMMARY OF THE INVENTION

It is therefore an object of the present invention to provide an effluent treating technology to decompose and to remove chlorine-based organic matter contained in effluent in which the treatment is conducted with high efficiency to resultantly suppress discharge of secondary products such as chlorine-based gas.

In accordance with one aspect of the present invention, there is provided an effluent treating method comprising the steps of; vaporizing effluent containing chlorine-based organic matter and producing vaporized gas containing chlorine-based organic gas; reacting said vaporized gas with photocatalytic material, with irradiating ultraviolet light, and decomposing the vaporized gas; and absorbing, adsorbing, or neutralizing said reacting step.

In accordance with one aspect of the present invention, there is provided an effluent treating apparatus comprising an effluent vaporizing tank; a photocatalytic material put in a container; an ultraviolet ray source irradiating ultraviolet light onto the photocatalytic material; a treating tank filled with an absorbing, adsorbing, or neutralizing agent; a first path connecting the effluent vaporizing tank and the container; and a second path connecting the container and the treating tank.

In the effluent treating apparatus according to the present invention, high photo oxidization efficiency and high aeration efficiency minimize the period of time required for the effluent treatment and lower the total cost. Quantity of chlorine-based organic matter contained in the effluent and/or discharge gas and quantity of chlorine-based gas as a secondary product can be reduced respectively to discharge standard values designated by laws. This contributes to suppression of environmental contamination.

Since the vaporizing section may be constituted with an apparatus or a device used in the prior art, any new technology is not required in this point and hence the total cost can be lowered.

The sections and members to be brought into contact with chlorine-based gas highly corrosive against metals are fabricated using corrosion-resisting materials. The granules of photocatalyst (photocatalytic granules) can be cleaned in this system. The configuration can be used for a long period of time and hence the cost for maintenance thereof is minimized.

Since the overall system configuration is elongated in a perpendicular direction, the system can be installed in a place with a small area in a horizontal plane. The system includes casters on its bottom section and can be therefore easily moved from one position to another position.

The system can be easily connected to various kinds of cleaning apparatuses which discharge waste fluid containing chlorine-based organic matter.

In the effluent treating method of the present invention, the time and the cost required for the treatment of effluent can be reduced, and quantity of chlorine-based organic matter contained in effluent and/or discharge gas and quantity of chlorine-based gas as a secondary product can be reduced to the respective discharge standard values designated by the pertinent laws.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

In this description, the word "photocatalytic material" means materials including photocatalyst. Other materials including other inorganic substance may be included in the photocatalytic material. A porous form including photocatalyst may be included. The word "photocatalytic granules (or photocatalytic powder)" are one of the examples of the photocatalytic materials. A form made by photocatalytic granules may be included. The photocatalytic granules involve a mixture of a photocatalyst particle and other powder like an inorganic powder.

Figure 1:
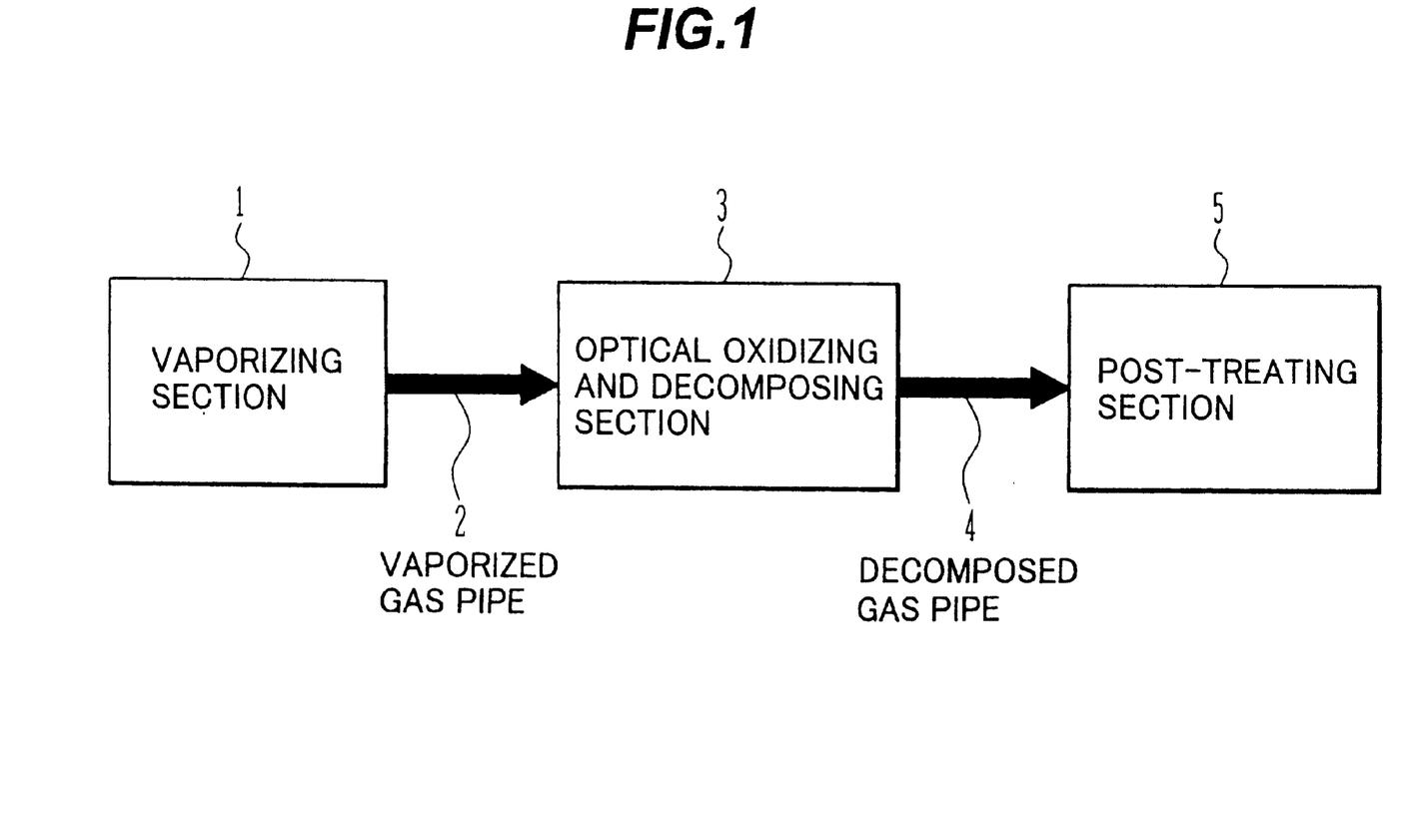
FIG. 1 is a diagram schematically showing an embodiment of an effluent treating apparatus according to the present invention.

FIG. 1 shows an embodiment of an effluent treating apparatus according to the present invention in a block diagram.

The embodiment of FIG. 1 includes a vaporizing section 1, an optical oxidizing and decomposing section 3, and a post-treating section. The vaporizing section 1 is coupled via a vaporized gas tube 2 with the optical oxidizing and decomposing section 3. The section 3 is coupled via a decomposed gas tube 4 with the post-treating section 5.

In the vaporizing section 1, effluent containing chlorine-based solvent is vaporized in an aeration process or a thermal vaporizing process. The vaporized gas containing chlorine-based organic gas or the like is fed via the vaporized gas tube 2 to the optical oxidizing and decomposing section 3. In the section 3, the gas is optically oxidized and decomposed. The decomposed gas containing chlorine-based gas and the like resultant from the optical oxidation and decomposition is fed via the decomposed gas tube 4 to the post-treating section 5. In the section 5, the gas is absorbed, adsorbed, and neutralized and is resultantly changed into harmless salts.

Figure 2A:
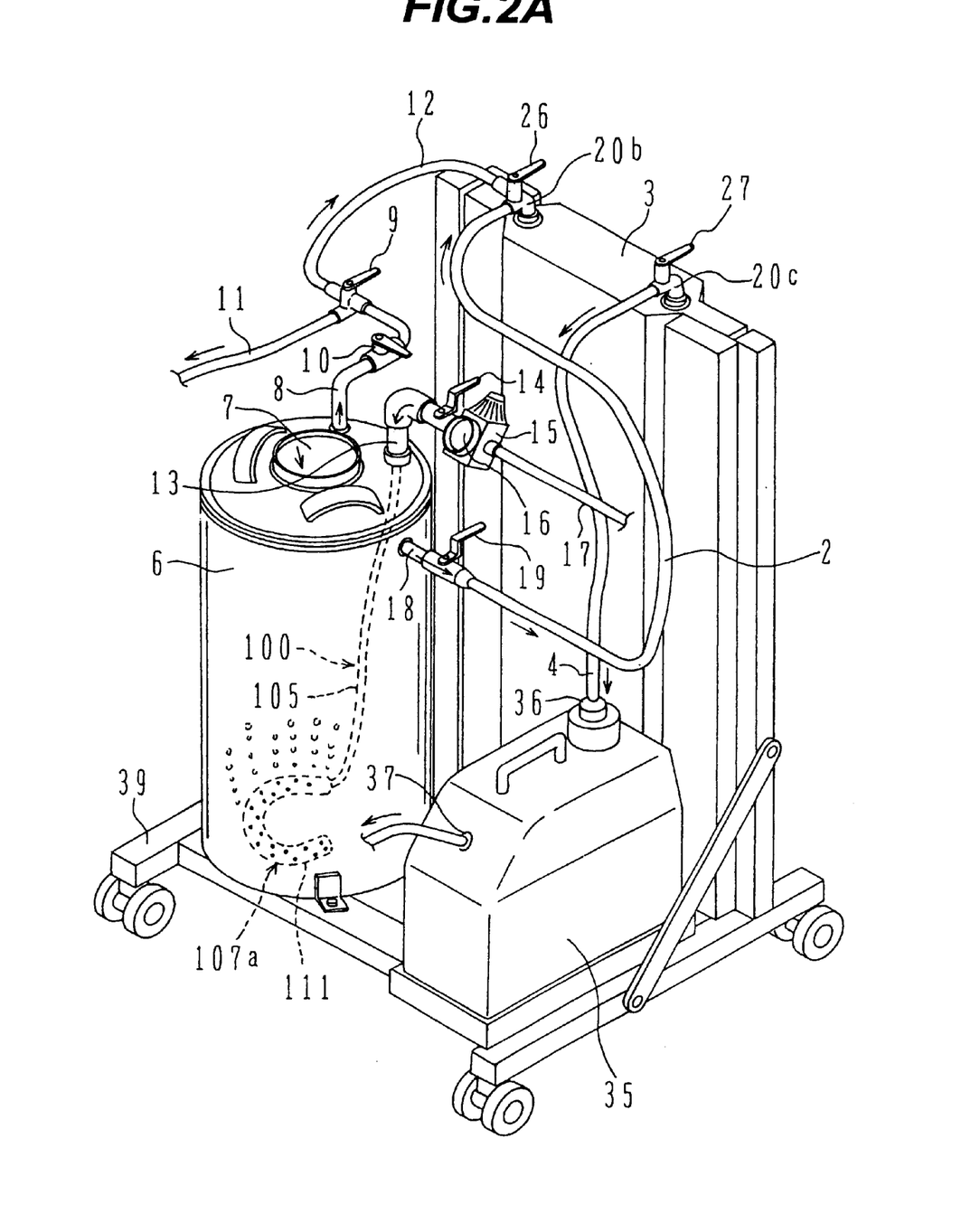
FIG. 2 is a perspective view showing an outline of an embodiment of an effluent treating apparatus according to the present invention.
Figure 2B:
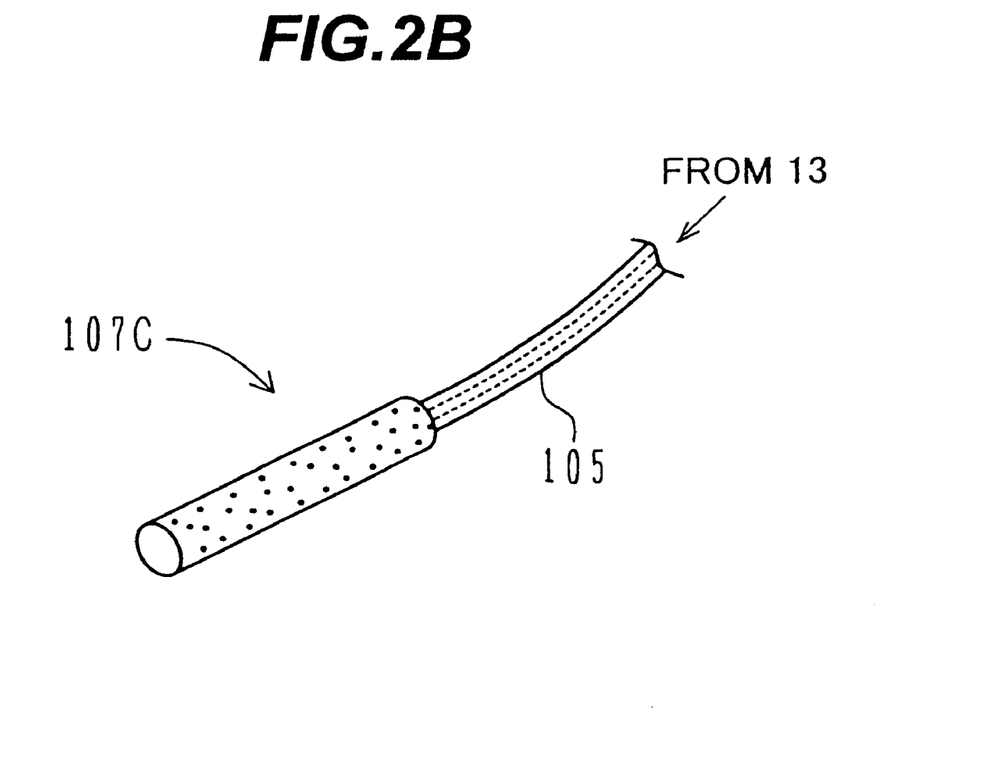
Figure 2C:
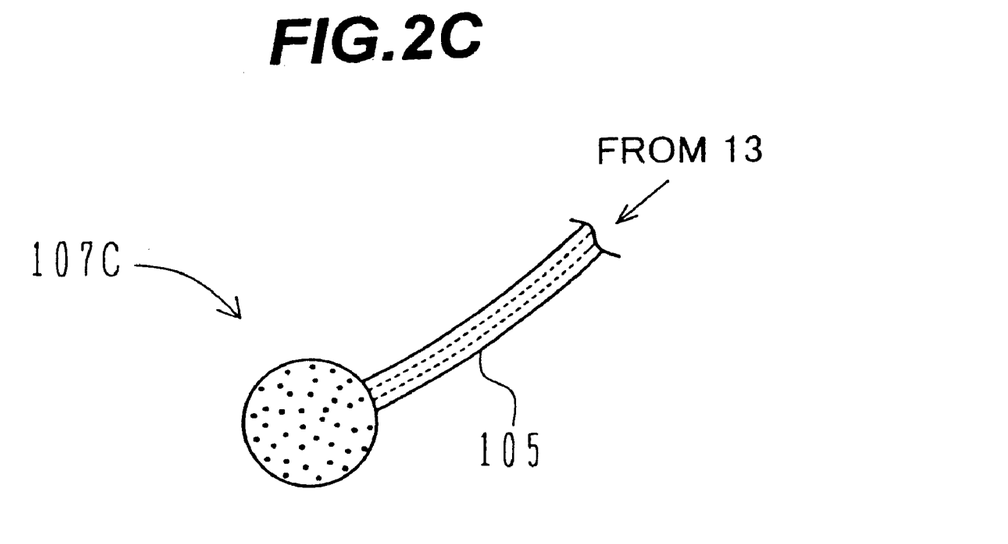
Figure 3:
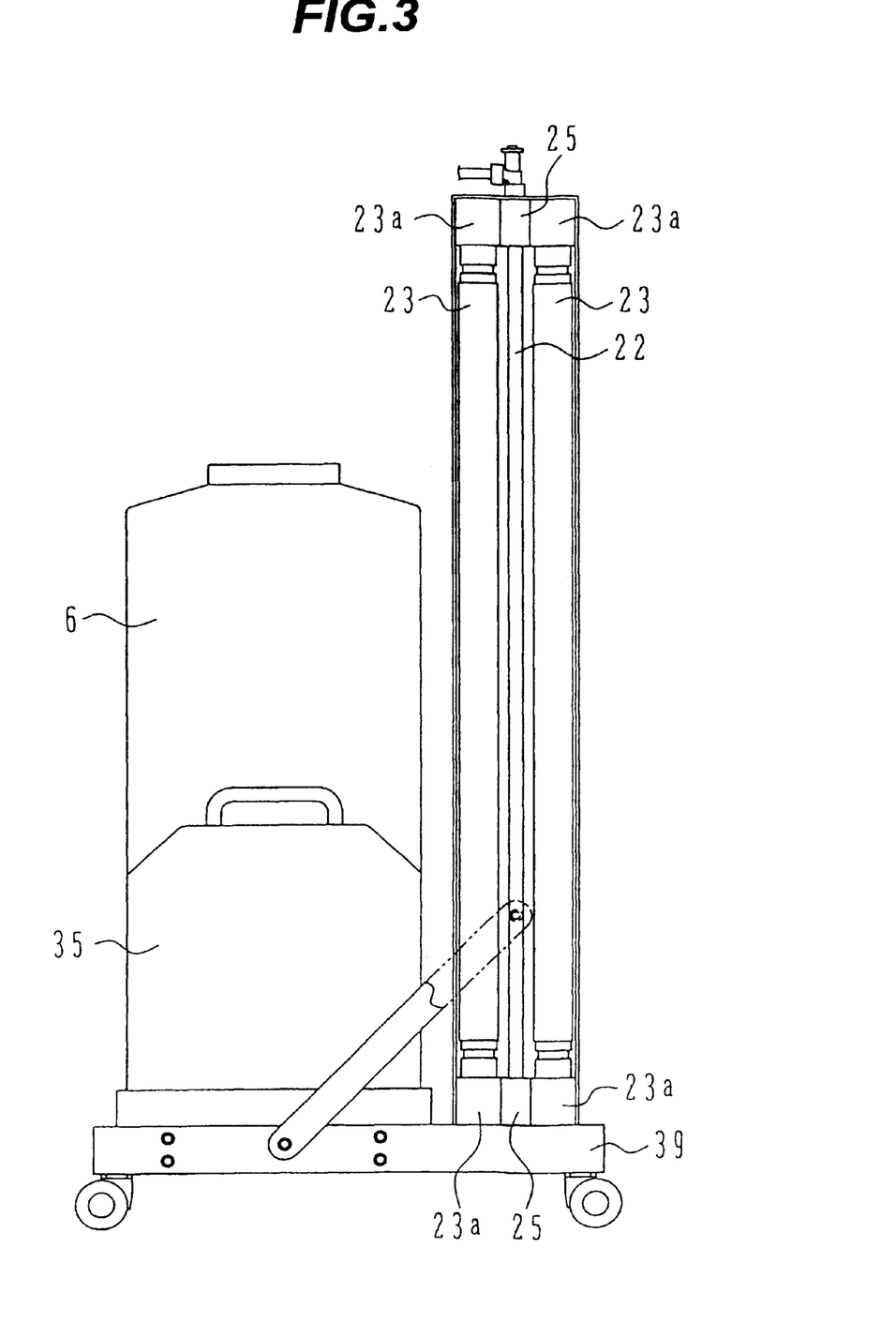
FIG. 3 is a side view, including partly a perspective view, showing the effluent treating apparatus shown in FIG. 2.
Figure 4:
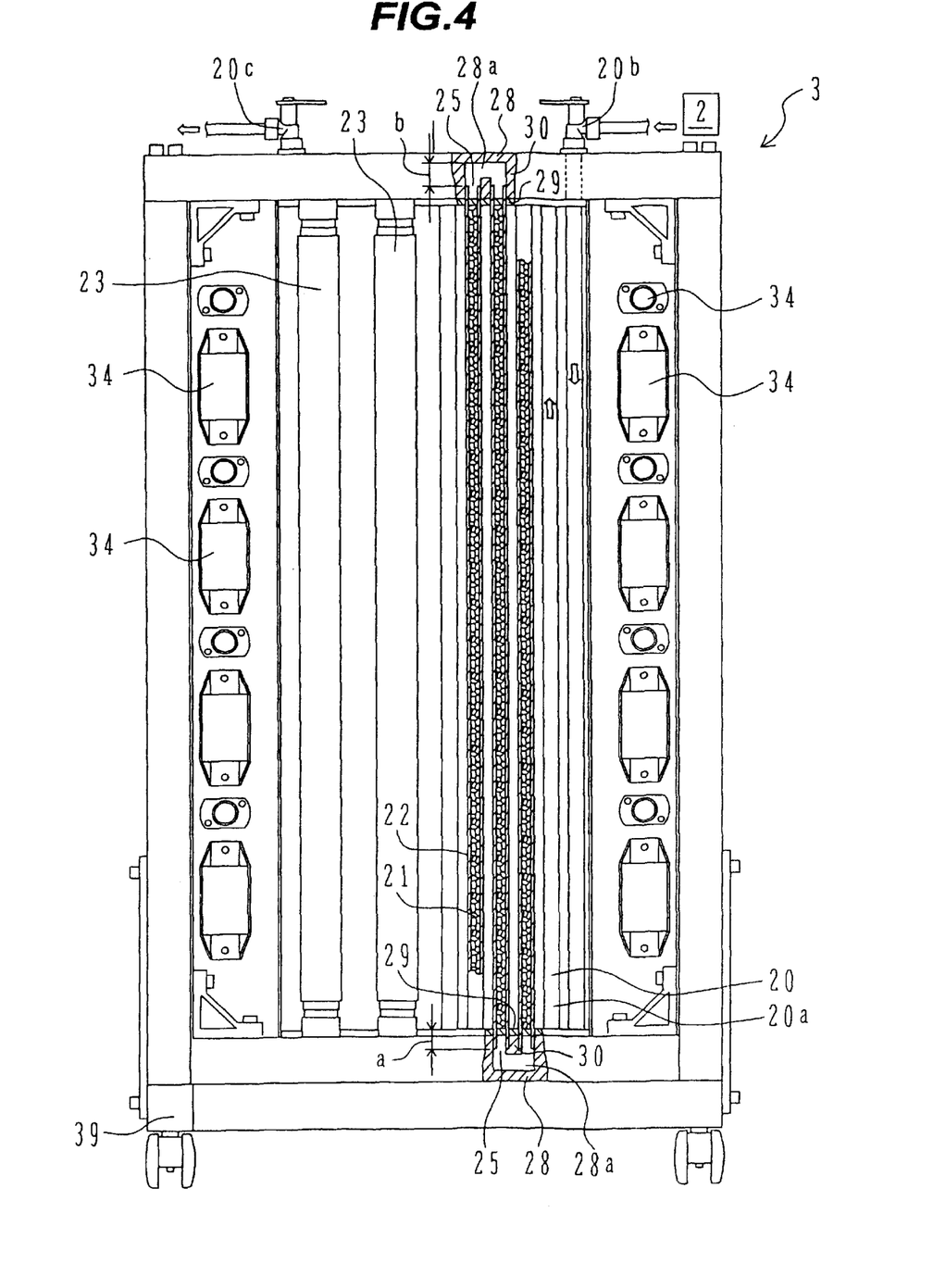
FIG. 4 is a schematic rear view, partly in a perspective view and partly in a cross-sectional view, showing the effluent treating apparatus shown in FIG. 2.
Figure 5:
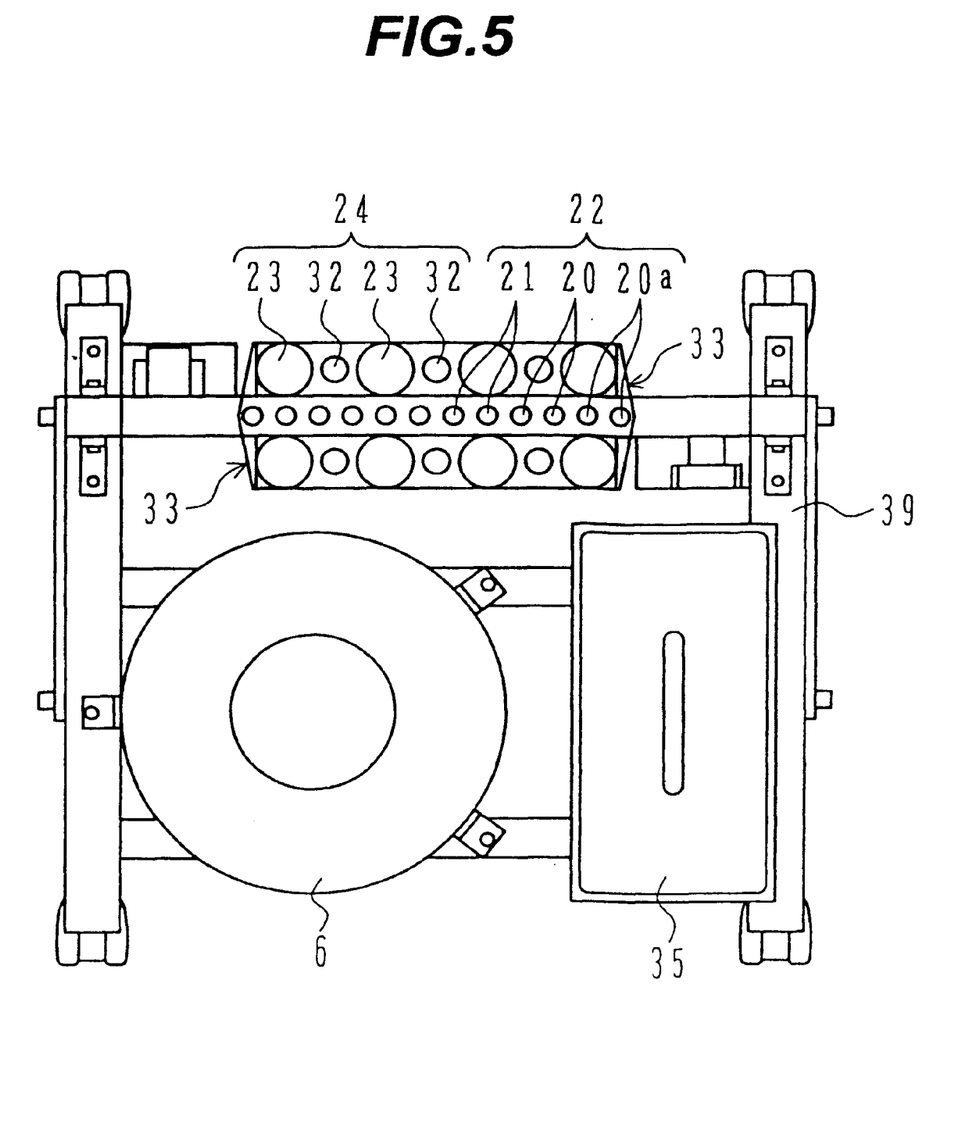
FIG. 5 is a schematic plan view, partly in a perspective view, showing-the effluent treating apparatus shown in FIG. 2.

FIG. 2 shows an embodiment of an effluent treating apparatus of the present invention in a schematic perspective view. FIG. 3 shows the effluent treating apparatus in a side view, FIG. 4 shows the effluent treating apparatus in a rear view, and FIG. 5 shows the effluent treating apparatus in a plan view.

As can be seen from FIG. 2, the vaporizing section 1 of FIG. 1 includes an aeration tank 6, an effluent inlet 7 to fill effluent in the tank 6, a waste fluid exhausting outlet 8 to discharge waste fluid after the aeration process, a compressed air inlet 13 to supply compressed air, and a vaporized gas output 18 to discharge gas after the aeration process. In the present specification, "effluent" means fluid which is supplied to an effluent treating apparatus of the present invention and which is made harmless by the apparatus. "Waste fluid" means fluid which is harmless as a result of treatment by the effluent treating apparatus and which is discharged from the effluent treating apparatus.

The aeration tank 6 is a cylindrical pressure container having, for example, a diameter ranging from about 10 cm to about 30 cm and a height ranging from about 20 cm to about 100 cm. The tank 6 is made of a macromolecular substance which is resistive against corrosion and chemicals and which has repellency. The macromolecular substance is, for example, a fluorine-based resin or a polyethylene-based resin. Alternatively, the aeration tank 6 is a tank having an inner wall coated with the material described above.

To increase aeration efficiency, a stirring apparatus including a jet unit, a propeller unit, or the like is arranged in the aeration tank 6.

For the waste fluid outlet 8, there are disposed a first branch valve 9, a first open/close valve 10, a waste fluid tube 11, and a cleaning agent tube 12. To discharge waste fluid after the aeration process from the apparatus, the first branch valve 9 is coupled with the waste fluid tube 11. To supply a photocatalyst cleaning agent to the photocatalyst reacting section 22, the first branch valve 9 is coupled with the cleaning agent tube 12 and the first open/close valve 10 is opened.

For the compressed air inlet 13, there are disposed a second open/close valve 14, a regulator 15, a pressure gauge or manometer 16, and a compressed air tube 17. The regulator 15 is disposed to control pressure in the aeration tank 6.

As a compressed air source AIR to be used in an aeration process, any compressed air source generally used in a laundry, a cleaning plant, or the like can be employed. Compressed air is supplied via the compressed air tube 17.

To increase aeration efficiency of the aeration tank 6, an air dispersing tube 100 is disposed for the compressed air inlet 13. The air dispersing tube 100 is coupled with the compressed air inlet 13 to supply bubbles of air in the aeration tank 6. Disposed for the tube 100 is a relatively long tube 105 and a dispersing section 107a formed at a tip end of the tube 105. The dispersing section 107a has small holes 111 formed therein. Air is released from the dispersing holes 111. FIG. 2(B) shows a variation of the dispersing section configured in a cylindrical form. FIG. 2(C) shows another variation of the dispersing section configured in a spherical form. The dispersing sections may be formed using a plastic such as polyethylene or a sintered ceramic.

For the vaporized gas outlet 18, a third open/close valve 19 is arranged. By opening the valve 19, the gas after the aeration process can be discharged to the vaporized gas tube 2.

The vaporized gas tube 2 is formed using a macromolecular substance highly resistive against corrosion such as a fluorine-based resin, a polyethylene-based resin, or a nylon-based resin and is coupled with the optical oxidizing and decomposing section 3.

As shown in FIG. 4, the optical oxidizing and decomposing section 3 includes gas tube 20 to pass vaporized gas supplied from the vaporized gas tube 2. The gas tube 20 is filled with photocatalytic granules 21, which optically oxidize and decompose organic substances in the gas. Instead of the photocatalytic granules, other photocatalytic materials such as powders, porous form or others can also be used. The gas tube 20 and the photocatalytic granules 21 constitute a photocatalyst reacting section 22. The system also includes ultraviolet ray sources 23 to irradiate ultraviolet light onto the photocatalytic granules 21. As shown in FIG. 5, an artificial light emitting section 24 including ultraviolet light sources 23 are disposed to oppose the photocatalyst reacting section 22.

The photocatalyst reacting section 22 can be constructed such as to decompose a vaporized gas in a closed reactor, not to pass through the reactor.

As can be seen from FIG. 4, the gas tube 20 has an inlet 20b and an outlet 20c. From about 2 to about 20 direct tube-shaped paths 20a each having a form of a straight tube are arranged in parallel to each other in the same perpendicular plane with a pitch of about 8 millimeters (mm) to about 35 mm to form perpendicular paths. The paths 20a are coupled with each other to form the gas tube 20. Specifically, as shown in FIG. 4, of a first pair of adjacent tube-shaped paths 20a, respective upper end sections are coupled by a coupling member 25 with each other. In a pair of paths including the last path 20a of the first pair and a subsequent path 20a, respective lower end sections are coupled by a coupling member 25 with each other. These coupled sections respectively form flow paths 28a. The tube-shaped paths 20a are mutually fixed to each other by a coupling member body 28 included in the structure of the overall optical oxidizing and decomposing section 3.

As shown in FIG. 2, a second branch valve 26 is disposed for the inlet 20b. To supply vaporized gas to the photocatalyst reacting section 22, the second branch valve 26 is coupled with the vaporized gas tube 2. To supply a photocatalyst cleaning agent to the photocatalyst reacting section 22, the second branch valve 26 is coupled with the cleaning agent tube 12.

For the outlet 20C, a fourth open/close valve 27 is disposed. By opening the valve 27, the gas after the optical oxidization and decomposition can be discharged to the decomposed gas tube 4.

As shown in FIG. 4, the tube-shaped paths 20a are formed using material which passes artificial light and natural light including ultraviolet light. For example, transparent material including borosilicate glass or synthetic resin is available.

Each tube-shaped path 20a has an inner diameter of about from 5 mm to about 30 mm, preferably, from about 8 mm to about 16 mm. When the inner diameter is less than 5 mm, the quantity of the photocatalytic granules 21 filled in the gas tube 20 is reduced and hence efficiency of the optical oxidization and decomposition is lowered. Additionally, since the gas flow rate is decreased due to the small inner diameter, the quantity of processed gas is lowered. Contrarily, when the inner diameter exceeds 30 mm, light emitted from the ultraviolet ray sources 23 does not fully reach a position near a central section of the tube-shaped path 20a. Therefore, light-receiving efficiency of the photocatalytic granules 21 is decreased and efficiency of the optical oxidization and decomposition is lowered.

The tube-shaped path 20a has favorably a length ranging from 200 mm to 800 mm. The length is favorably substantially equal to that of the ultraviolet ray sources 23. Under this condition, ultraviolet rays from the light sources 23 can be uniformly irradiated onto the photocatalyst reacting section 22 throughout the length thereof. This increases efficiency of the optical oxidization and decomposition.

In the tube-shaped path 20a, a holding member 31 is disposed at each of both ends thereof to hold the photocatalytic granules 21. The holding member 31 has a contour to pass air therethrough and is made of macromolecular substance highly resistive against corrosion such as a fluorine-based resin, an ethylene-based resin, or a nylon-based resin. The holding member 31 has a diameter substantially equal to the inner diameter of the tube-shaped path 20a. The member 31 has a thickness of, for example, about 5 mm to about 30 mm.

The photocatalytic granules 21 are produced by mixing photocatalyst particles with inorganic powder to adsorb chlorine-based organic gas, chlorine-based gas, and the like.

When irradiated with light, for example, near ultraviolet light, the photocatalyst particles are activated to enhance an optical oxidizing and decomposing reaction of an organic substance brought into contact with the activated photocatalytic granules. For example, titanium dioxide ($TiO_2$), cadmium blend (CdS), strontium titanate ($SrTiO_3$), and ferric oxide ($Fe_2O_3$) are available as photocatalyst particles. Particularly, titanium dioxide has high performance and is inexpensive and hence lowers the total cost.

Specifically, the inorganic powder may be, for example, calcium silicate, calcium carbonate, sodium carbonate, lime, kaolinite, wollastnite, talc, nepheline (nepheline-bearing syenites), zeolite, calcium hydroxide and activated charcoal. One kind of these substances is used or two or more kinds thereof are mixed with each other for this purpose.

The photocatalyst particles are contained in the photocatalytic granules 21 in a range of from 10 weight % (wt %) to 95 wt %, preferably, from 30 wt % to 70 wt %, and still more preferably from 40 wt % to 60 wt %. When the content is 10 wt % or less, performance of the optical oxidization and decomposition is lowered and there may arise a disadvantage that the chlorine-based organic gas not decomposed is exhausted. When the content is 95 wt % or more, capability of the photocatalytic granules 21 to adsorb and to keep chlorine-based organic gas is reduced. Moreover, when highly concentrated chlorine-based organic gas is supplied to the system, the chlorine-based organic gas cannot be fully captured. This also results in the disadvantage that the chlorine-based organic gas not decomposed is exhausted.

The photocatalytic granules 21 are favorably formed as particles by compression. Specific forms thereof are, for example, a spherical form, a barrel form, a form of a short rod, an ellipsoidal form, and a tablet form (substantially a form of a circular cylinder). Holes may be formed in the photocatalytic granules 21 and/or projections may be formed on surfaces thereof.

Each of the photocatalytic granules 21 has a diameter ranging from 1 mm to 20 mm, preferably, from about 2 mm to about 10 mm. The diameters of the photocatalytic granules 21 have a mean value ranging from about 4 mm to about 8 mm, preferably, from about 5 mm to about 7 mm. When the particle diameter is 1 mm or less, clogging easily occurs. Since the gas flow rate is resultantly decreased in the photocatalyst reacting section 22, efficiency of the optical oxidization and decomposition is lowered. When the particle diameter is 20 mm or more, a specific surface area of the photocatalytic granules 21 (a surface area per unitary weight of the photocatalytic granules 21) becomes smaller. Additionally, it is difficult for the light emitted from the ultra violet ray sources 23 to reach a central section of the gas tube 20. Light receiving efficiency of the photocatalytic granules 21 lowers and hence there appears a tendency that the efficiency of the optical oxidization and decomposition is minimized.

The coupling member 25 includes a body section 28 to couple both ends of the tube-shaped path 20a with each other, a cover or cap section 29 attachable to the body section 28, and an o-shaped ring 30 as an annular sealing member.

The body section 28 is a member in a shape of a rectangular parallelepiped or a cuboid having an opening in which an end section of the tube-shaped path 20a is inserted. From the end section of the path 20a to an associated end section of the path 20a adjacent thereto, air can be passed via the flow path 28a disposed in the body section 28.

The flow path 28a has an inner surface coated with a macromolecular substance highly resistive against corrosion and chemicals such as a fluorine-based resin or a polyethylene-based resin. Alternatively, the body section 28 may be formed using a metal highly resistive against corrosion and chemicals such as hasteloy or a macromolecular substance highly resistive against corrosion and chemicals such as a fluorine-based resin, a polyethylene-based resin, or PPS (Polyphenylene Sulfide).

A peripheral edge of the opening is tapered to a taper section to mount an o-shaped ring 30 having a diameter gradually increasing in a direction toward an opening end edge. Between the taper section and the tube-shaped path 20a, the o-shaped ring 30 is installed.

The cap section 29 has insertion holes to pass the paths 20a and 20a therethrough. The cap section 29 is attached to the body section 28 with the cap section 29 brought into contact with the opening end edge.

The o-shaped ring 30 is installed in a state in which the ring 30 is in contact with the body section 28, the cap section 29, and an outer surface of the path 20a in a gap between the taper section and the path 20a. It is favorable that the o-shaped ring 30 is depressed by the body section 28 and the cap section 29 to be elastically deformed. The o-shaped ring 30 is therefore made of an elastic material such as lubber.

In the body section 28, the diameter on an upper end of each of the opening and the insertion hole is larger than an outer diameter of the path 20a so that the path 20a moves in a longitudinal direction thereof.

By moving the path 20a toward the upper end thereof, the lower end thereof leaves an upper surface of the cover section 29 and the path 20a can be inclined. The path 20a can be therefore removed without removing the cover section 29. The path 20a is inserted with the lower end thereof apart from the cover section 29 and the body section 28 by a length of a and with the upper end thereof apart from a deepest position of the flow path in the body section 28 by a distance of b (b>a).

On the lower edge side of the body section 28, the insertion hole of the path 20a has a step section having a diameter smaller than the outer diameter of the path 20a. The path 20a is hence hindered not to exceed the limit of the length a. The insertion length a of the path 20a is uniform on the upper and lower edge sides.

As shown in FIGS. 3 and 5, the artificial light emitting section 24 is arranged on a front side and a rear side of the photocatalyst reacting section 22. The artificial light emitting section 24 includes an ultraviolet ray sources 23, in the form of elongated tubes, arranged in one plane to oppose the photocatalyst reacting section 22 and a holder 23a in a form of a rectangular plate to fix light emitting sources 23.

The ultraviolet ray sources 23 are disposed in a perpendicular direction to emit ultraviolet light uniformly onto the overall photocatalyst reacting section 22. The ultraviolet light emitting sources 23 are disposed in parallel with each other with a horizontal pitch ranging from about 2 cm to about 100 cm. Specifically, on each of a front side and a rear side of the photocatalyst reacting section 22, one ultraviolet light emitting source 23 is arranged for every two to four paths 20a. Heat generated by the ultraviolet light emitting sources 23 does not influence the photocatalyst reacting section 22.

As the ultraviolet light emitting sources 23, excimer lamps and black light lamps for general use are available.

The holder 23a has an opening 32 to radiate heat. The opening 32 has a diameter ranging from about 10 mm to about 20 mm. In the holder 23, a ratio (opening ratio) of an area of the opening 32 to an overall area of the holder 23 ranges favorably from about 10% to about 40%. The opening 32 is not particularly limited in its form and may have a circular form, a rectangular form, or the like.

A reflection plate 33 is disposed to surround the photocatalyst reacting section 22 and the artificial light emitting section 24. When the ultraviolet light emitting source 23 is turned on and emits light to the reflection plate 33, the plate 33 reflects the light with high reflection efficiency. In the configuration, the reflected light is irradiated onto the photocatalytic granules 21 and does not leak out from the system. As shown in FIG. 5, the reflection plate 33 is preferably configured in a hexagonal cross-sectional contour on a horizontal plane.

The reflection plate 33 is made of material which favorably has a smooth surface and which efficiently radiates heat, for example, aluminum, stainless steel, or copper.

The ultraviolet light emitting sources 23 have on/off switches 34 to turn on/off the light sources 23. To prevent influence from heat generated from the light sources 23, the switches 34 are arranged in a perpendicular direction on each of the right and left sides of the photocatalyst reacting section 22.

As shown in FIG. 2, the composed gas tube 4 is coupled with the post-treating section 5.

The post-treating section includes the treating tank 35, a decomposed gas inlet 36, and a discharge gas and water outlet 37.

The decomposed gas tube 4, the treating tank 35, and the decomposed gas inlet 36 are desirably formed using macromolecular substance highly resistive against corrosion and chemicals such as a fluorine-based resin, a polyester-based resin, or a nylon-based resin.

The treating tank 35 is a container substantially in a form of a parallelepiped having a bottom area ranging from about 100 $cm^2$ to about 300 $cm^2$, a height ranging from about 100 cm to about 500 cm, and a capacity ranging from about 10 liter to about 30 liter. The tank 35 is formed using a material highly resistive against corrosion such as a polyester-based resin or a fluorine-based resin or has an inner surface coated with such a material.

The treating tank 35 is filled with a treating agent which absorbs, adsorbs, and neutralizes the decomposed gas supplied from the decomposed gas inlet 36.

The treating agent is alkaline ionic water containing at least one selected from a group including, for example, calcium sulfite, calcium silicate, sodium carbonate, sodium bicarbonate, sodium thiosulfate, calcium carbonate, lime, ammonia, sodium hydroxide (caustic soda), alkaline water, calcium hydroxide, and water.

The treating agent is not limited to a liquid phase, but may be a fluidized bet in the form of powder, or may be in a combination of the liquid phase and the fluidized bed. Each of the treating agents has the absorbing and adsorbing functions. The treating agents other than water have the neutralizing function as a chemical reaction.

To increase efficiency of the post-treatment, an air dispersing tube 107a is desirably disposed in the treating tank 35 coupled with the decomposed gas inlet 36.

The vaporizing section 1, the optical oxidizing and decomposing section 3, and the post-treating section 5 are detachably installed in the configuration so that when any one thereof fails, only the failed section is replaced. These sections 1, 3, and 5 are arranged on a base section 39 which has a longitudinal length ranging from about 20 cm to about 50 cm and a vertical length ranging from about 20 cm to about 50 cm and four casters on the bottom thereof.

In the effluent treating apparatus, evaporated gas containing chlorine-based organic gas produced by vaporizing the effluent in the vaporizing section 1 is optically oxidized and decomposed by the optical decomposing and decomposing section 3. Decomposed gas containing chlorine-based gas produced in the process is changed into harmless salts by the post-treating section 5. Quantity respectively of waste fluid after the treatment, chlorine-based organic substance contained in waste fluid and discharge gas after the treatment and quantity of chlorine-based gas discharged as a secondary product can be lowered to the respective standard values. This contributes to the suppression of the environmental contamination.

Chlorine-based organic matter contained in waste fluid from, for example, a dry cleaning apparatus is vaporized by the vaporizing section 1 and is then optically oxidized and decomposed by the optical oxidizing and decomposing section 3. When compared with a case in which the effluent is directly supplied to the optical oxidizing and decomposing section 3, efficiency of the optical oxidization and decomposition can be increased, and the time and cost required for the treatment is minimized.

When the tube-shaped path 20a in the optical oxidizing and decomposing section 3 has an inner diameter ranging from about 5 mm to about 30 mm and a length ranging from about 200 mm to about 800 mm, ultraviolet light from the ultraviolet ray source 23 can be irradiated onto the photocatalyst reacting section 22 uniformly along its overall length up to the central section thereof. Since the gas tube 20 can be sufficiently filled with the photocatalytic granules 21, the optical oxidization and decomposition is efficiently conducted.

When the particle diameter of the photocatalytic granules 21 ranges from about 1 mm to about 20 mm, that is, when the specific surface area of the photocatalytic granules 21 becomes greater, contact efficiency of contact between the photocatalytic granules 21 and the vaporized gas is increased and light receiving efficiency of the photocatalytic granules 21 is also increased. This consequently improves efficiency of the optical oxidization and decomposition.

A mixture of photocatalyst particles and inorganic powder to adsorb chlorine-based organic gas, chlorine-based gas, and the like is used as the photocatalytic granules 21. Consequently, the optical oxidization and decomposition is carried out in a state in which chlorine-based organic gas and the like are adsorbed and are held by the photocatalytic granules. Therefore, efficiency of the optical oxidization and decomposition is increased and only chlorine-based organic matter decomposed is discharged from the optical oxidizing and decomposing section 3.

The inner surfaces of the paths in which the vaporized gas and/or the decomposed gas flows/flow are coated with macromolecular substance highly resistive against corrosion and chemicals such as a fluorine-based resin or a polyethylene-based resin or the paths are made of such a substance. Therefore, the paths are therefore resistive against corrosion by chlorine-based gas and the like.

By regulating the pressure in the aeration tank 6 to a value ranging from +0.1 kg/cm$^2$ to 5.0 kg/cm$^2$ in the aeration process, bubbles formed in the effluent by the aeration process can be minimized. This increases the area of contact between the effluent and air and the period of time of the contact therebetween. Efficiency of the aeration process can be resultantly increased and the period of time required for the process is reduced. By the pressure in the aeration tank 6, the vaporized gas can be discharged to the vaporized gas tube 2, which leads to efficient saving of energy.

Since any compressed air source generally used in a laundry, a cleaning plant, or the like can be used as the compressed air supply in the aeration process, the cost required to introduce a new technique can be dispensed with.

Since the inner surface of the aeration tank 6 is coated with macromolecular substance such as a fluorine-based resin or a polyethylene-based resin, chlorine-based organic matter does not fix onto the inner surface. The contact efficiency between the chlorine-based organic matter and the bubbles can be increased to achieve the aeration process with high efficiency.

Since the stirring apparatus is disposed in the aeration tank 6, chlorine-based organic matter does not remain on the bottom and/or the inner surface of the tank 6. This increases the contact efficiency between the chlorine-based organic matter and the bubbles. Therefore, the aeration process can be achieved with high efficiency.

Since the air dispersing section is arranged for the compressed air inlet 13 in the aeration tank 6, the diameter of the bubbles formed in the effluent by the aeration process can be minimized. The contact area between the effluent and the bubbles and the contact time of the contact therebetween can be increased to conduct a highly efficient aeration process.

Since the aeration tank 6 is a container structured in a perpendicularly elongated configuration, the contact area between the effluent and air and the contact time of the contact therebetween can be increased. This increases the aeration efficiency and minimizes the time required for the treatment.

Since the tube-shaped paths 20a and the ultraviolet ray sources 23 are disposed in a perpendicular direction and the optical oxidizing and decomposing section 3 has a configuration elongated in the perpendicular direction, only a small area is required for the system installation.

By supplying neutral or alkaline aqueous solution to the photocatalyst reacting section 22, decomposed substances such as chlorine-based gas and the like absorbed by and accumulated on the photocatalytic granules 21 can be easily cleaned and removed. The efficiency of the optical oxidization and decomposition of the photocatalytic granules 21 is therefore kept at a satisfactory level. This prevents the drawback that chlorine-based organic matter not decomposed is discharged from the optical oxidizing and decomposing section 3 into an external space.

Referring now to FIG. 2, description will be given of an effluent treating method using the effluent treating apparatus.

First, effluent of about 10 liter to about 20 liter is supplied from the effluent inlet 7 into the aeration tank 6 with the first, second, and third open/close valves 10, 14, and 19 kept closed.

A specific example of the effluent is industrial effluent containing chlorine-based organic matter discharged from a cleaning apparatus used in a dry cleaning, cleaning of metallic parts, or the like.

While checking the pressure gauge 16, compressed air is adjusted to a pressure of about 0.5 kg/cm$^2$ to about 5 kg/cm$^2$ by the regulator 15 and is supplied from the compressed air supply AIR to the compressed air tube 17 disposed for the compressed air inlet 13. By opening the second and third valves 14 and 19, the aeration process is started with an air flow rate ranging from about 5 liter/min to 50 liter/min. By adjusting the pressure of the compressed air supplied via the compressed air tube 17, the pressure in the aeration tank 6 can be kept to a pressurized state ranging from +0.1 kg/cm$^2$ to +5.0 kg/cm$^2$ relative to the atmospheric pressure. The pressurized state is favorably set to +0.5 kg/cm$^2$ to +3.0 kg/cm$^2$ with respect to the atmospheric pressure. Bubbles formed in the effluent by the aeration process can be therefore minimized. For the same air capacity, the contact area between the effluent and air and the contact time of contact therebetween can be increased and aeration efficiency is improved.

Vaporized gas containing chlorine-based organic gas thus air seasoned is fed by the inner pressure of the aeration tank 6 through the vaporized gas outlet 18 to the vaporized gas tube 2. By opening the second branch valve 26, the vaporized gas is introduced from the vaporized gas tube 2 via the inlet 20b to the photocatalyst reacting section 22 of the optical oxidizing and decomposing section 3.

The vaporized gas containing chlorine-based organic gas supplied to the photocatalyst reacting section 22 flows through the section 22 and is then brought into contact with the photocatalytic granules 21 to be trapped or captured by inorganic powder contained in the photocatalytic granules 21.

In this state, by irradiating ultraviolet light from the ultraviolet ray sources 23 onto the photocatalytic granules 21, photocatalyst particles contained in the photocatalytic granules 21 are activated. By catalysys of the activated photocatalyst particles, the chlorine-based organic matter and the like captured by the inorganic powder achieves a reaction of optical oxidization and decomposition.

By opening the fourth open/close valve 27, gas containing chlorine-based gas produced by the reaction of oxidization and decomposition of the chlorine-based organic matter and the like is introduced to the decomposed gas tube 4. The gas containing the chlorine-based gas is discharged from the outlet 20c into an external space with respect to the optical oxidizing and decomposing section 3. The gas passes through the decomposed gas tube 4 and is supplied via the decomposed gas inlet 36 to the treating tank 35.

The chlorine-based gas and the like contained in the decomposed gas supplied to the treating tank 35 are neutralized by alkaline ions contained in the treating agent beforehand filled in the treating tank 35 and are converted into harmless salts or are absorbed by the treating agent and are removed.

The resultant harmless gas or water is discharged via the waste gas/water outlet 37 to an external space.

After a lapse of a predetermined period of time, the second and third open/close valves 14 and 19 are closed. The first valve 9 of the waste fluid outlet 8 is then coupled with the waste fluid tube 11. The first open/close valve 10 is then opened. Using a remaining pressure in the aeration tank 6, the waste fluid after the aeration process is discharged via the waste fluid tube 11 to an external space.

There may be used a method in which in place of the effluent, neutral or alkaline aqueous solution to clean the photocatalytic granules 21 is filled in the aeration tank 6 in almost the same procedure as described above. Compressed air is supplied to the aeration tank 6 to pressurize the inside thereof. The first branch valve 9 for the waste fluid outlet 8 is then coupled with the cleaning agent tube 12, and the tube 12 is coupled with the second branch valve 26. By opening the first open/close valve 10, the neutral or alkaline aqueous solution discharged by the inner pressure of the aeration tank 6 is supplied to the photocatalyst reacting section 22. The decomposed products accumulated on the photocatalytic granules 21 can be cleaned and released.

Another method for cleaning the photocatalytic granules 21 using neutral or alkaline cleaning agent is as follows. Apart from a gas seasoning tank 6, another tank for storing cleaning agent is disposed. The cleaning agent can be supplied to photocatalyst reacting section 22 by changing, for example, a valve to switch the path from the gas seasoning tank 6 to the another tank.

In the effluent treating method, the vaporized gas containing chlorine-based organic gas resultant from vaporization of effluent by the vaporizing section 1 is optically oxidized and decomposed by the optical oxidizing and decomposing section 3, and resultant decomposed gas containing chlorine-based gas is changed into harmless salts by the post-treating section 5. Quantity respectively of waste fluid after the treatment, chlorine-based organic substance contained in waste fluid and discharge gas after the treatment and quantity of chlorine-based gas discharged as a secondary product can be lowered to the limit values of the respective standards. This contributes to suppression of the environmental contamination.

Chlorine-based organic matter contained in waste fluid is vaporized by the vaporizing section 1 and is then optically oxidized and decomposed by the optical oxidizing and decomposing section 3. Therefore, in comparison with a case in which the effluent is directly processed by the optical oxidizing and decomposing section 3, efficiency of the optical oxidization and decomposition can be increased, and the time and cost required for the treatment is minimized.

Since the aeration is carried out by regulating the pressure in the aeration tank 6 to a value ranging from +0.1 kg/cm$^2$ to 5.0 kg/cm$^2$, bubbles formed in the effluent by the aeration process can be minimized. This increases the area of contact between the effluent and air and the period of time of the contact therebetween. Efficiency of the aeration process can be resultantly increased and the period of time required for the process is reduced. The pressure in the aeration tank 6 can discharge the vaporized gas discharged to the vaporized gas tube 2. It is therefore possible that energy is efficiently used and the time and cost required for the treatment is minimized.

The treatment includes a process in which neutral or alkaline aqueous solution is fed to the photocatalyst reacting section 22 so that decomposed products adsorbed and accumulated on the photocatalytic granules 21 are cleaned and released. This keeps satisfactory efficiency of the optical oxidization and decomposition of the photocatalytic granules 21 and hence the time and cost required for the treatment are reduced.

Figure 6:
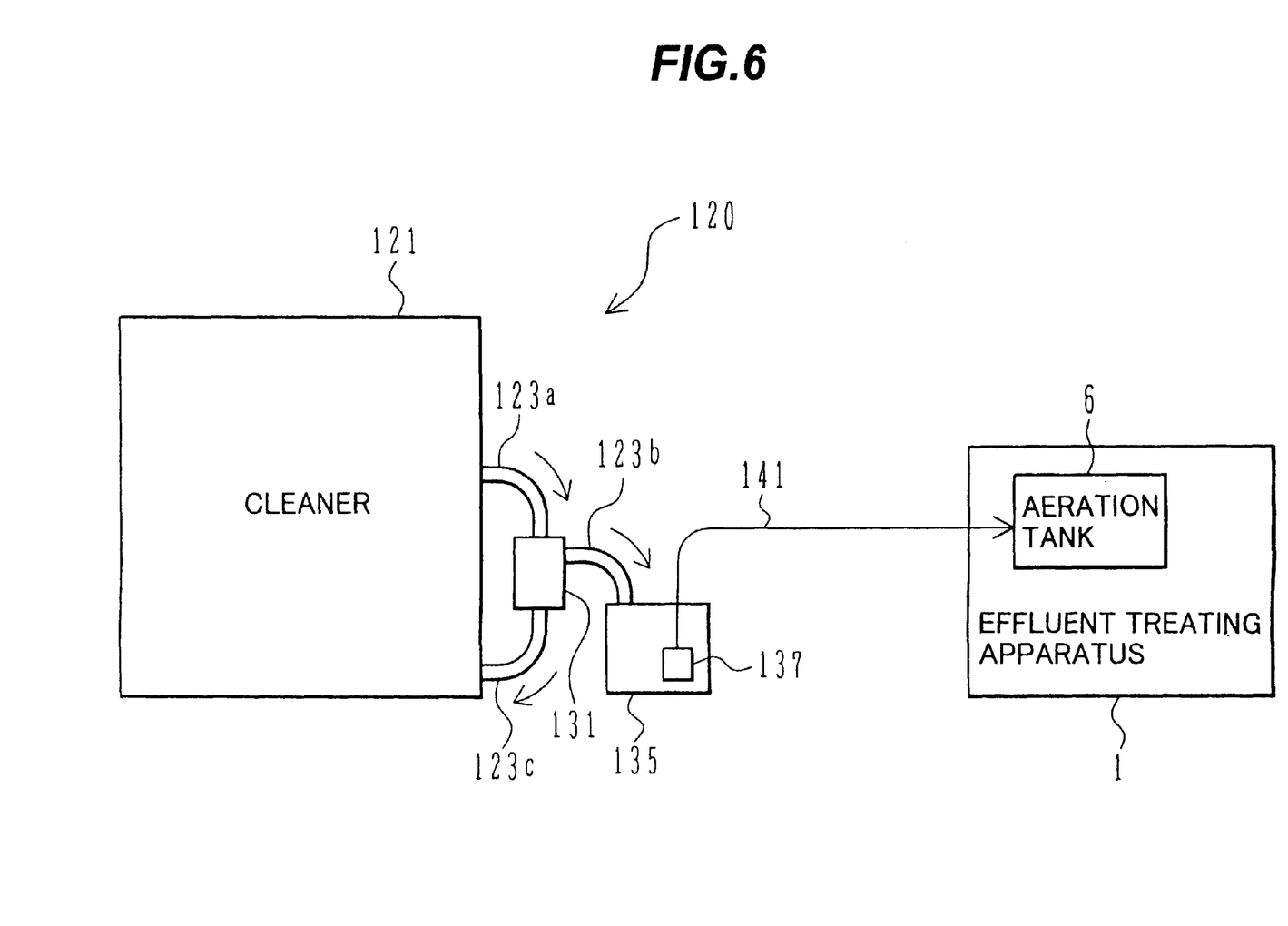
FIG. 6 is a schematic diagram showing an embodiment of a cleaning apparatus according to the present invention.

As can be seen from FIG. 6, the cleaning apparatus 120 is a combination of the effluent treating apparatus 1 and a cleaner 121.

The cleaner 121 is a unit having a cleaning function of, for example, a dry cleaning apparatus generally used today.

The cleaner 121 cleans, using a cleaning agent, articles of clothing, semiconductor parts, mechanical parts, and the like.

The cleaning agent employed for the cleaning by the cleaner 121 is discharged from an entry-side hose 123a. The hose 123a is coupled with a water separator 131.

The water separator 131 separates a solvent from water.

The solvent is fed from the water separator 131 via a collection-side hose 123c to be collected again in the cleaner 121.

The water is fed via an outlet-side hose to a buffer tank 135.

The water once accumulated in the buffer tank 135 is then supplied by a pump 137 via a hose 141 to the aeration tank 6 of the effluent treating apparatus 1.

Referring to FIGS. 2 to 5, description will be given of an embodiment of the effluent treating apparatus.

As shown in FIGS. 2 to 5, the effluent treating apparatus of the embodiment includes 12 tube-shaped paths 20a of which each has an inner diameter of 10 mm, an outer diameter of 12 mm, and a length of 690 mm. The tube-shaped paths 20a are arranged on one plane with a horizontal pitch of 20 mm. In the configuration adjacent tubes 20a are coupled with each other to collectively form a gas tube 20 to bidirectionally pass gas in a perpendicular direction.

In the photocatalytic granules 21 to be filled in the paths 20a, titanium dioxide ($TiO_2$) is used as the photocatalyst particles and talk is used as the inorganic powder. Titanium dioxide is 66 wt % in the photocatalytic granules 21. The photocatalytic granules 21 are prepared by compressing the materials into the form of tablets each of which has a diameter of 5 mm and a maximum height of 3 mm.

The ultraviolet ray sources 23 are eight black light lamps of 30 watt. Each lamp has an outer diameter of 32 mm and a length of 690 mm. Of the eight lamps 23, four lamps 23 and four lamps 23 are arranged respectively on the front and rear sides of the photocatalyst reacting section 22. On each side, the lamps 23 are arranged in a plane with an equal interval therebetween. Ultraviolet light is irradiated from the respective lamp groups uniformly onto the front and rear sides of the photocatalyst reacting section 22 along the overall length of the section 22.

Solution with a sodium hydroxide concentration of 3% is used as the treating agent to be filled in the treating tank 35.

The base section 39 has a vertical length of 450 mm and a longitudinal length of 400 mm and includes four casters on its bottom section.

The aeration tank 6 is filled with 15 liter of effluent in which concentration of chlorine-based organic matter is 150 mg/liter. While regulating the flow rate of seasoning air to 10 liter/min and the inner pressure of the aeration tank 6 to 2 $kg/cm^2$, aeration is conducted for 90 minutes. Vaporized gas is fed by the inner pressure of the tank 6 to the photocatalyst reacting section 22, and decomposed gas resultant from the optical oxidization and decomposition is introduced to the treating tank 35.

In the treatment, concentration of chlorine-based organic gas in the vaporized gas discharged from the vaporized gas outlet 18, concentration of chlorine-based organic gas and concentration of chlorine-based gas in the decomposed gas discharged from the outlet 20c, and concentration of chlorine-based gas in the gas discharged from the waste gas outlet 37 are measured in a known method using a gas detecting tube.

Concentration of chlorine-based organic matter in waste fluid after the aeration is conducted for 90 minutes is also measured in a similar way.

Results of the measurement indicate that the chlorine-based organic gas contained in the vaporized gas discharged from the vaporized gas outlet 28 has a maximum concentration of 6000 ppm. In contrast thereto, the chlorine-based organic gas contained in the decomposed gas discharged from the outlet 20c is equal to or less than a minimum detection limit of the measuring system.

The chlorine-based gas contained in the decomposed gas discharged from the outlet 20c has a maximum concentration of 40 ppm. In contrast thereto, the chlorine-based gas contained in the gas discharged from the waste gas outlet 37 is equal to or less than a minimum detection limit of the measuring system (0.06 ppm)

The concentration of chlorine-based organic matter contained in the waste fluid after the aeration is 0.05 mg/liter, namely, less than the effluent standard value (0.1 mg/liter).

Adsorbability of chlorine-based organic matter is compared between the photocatalytic granules 21 used in the embodiment and titanium dioxide ($TiO_2$) supported on a net, the titanium dioxide being available in the market.

After 50 micro liter ($\mu$ liter) of trichloroethylene is filled in a dessicator in which 50 grams of photocatalytic granules 21 or the titanium dioxide ($TiO_2$) supported on a net are or is installed, the dessicator is allowed to stand for 10, 20, and 30 minutes in a sealed state with light shielded. At the respective points of time, concentration of trichloroethylene is measured by the method using a gas detecting tube. Results of the measurement are listed in Table 1.

As can be seen from Table 1, it is found that the photocatalytic granules 21 used in the measurement have high adsorbability of chlorine-based organic matter.

TABLE 1

| | Concentration of trichloroethylene in dessicator (ppm) | |
|---|---|---|
| Time (min) | Photocatalytic granules | Titanium dioxide ($TiO_2$) on net |
| 0 | 0 | 0 |
| 10 | 700 | 1700 |
| 20 | 500 | 1600 |
| 30 | 400 | 1500 |

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An effluent treating equipment, comprising:
   an effluent vaporizing tank;
   a photocatalytic material put in a container, wherein said container comprises a third path filled with photocatalytic material;
   at least one ultraviolet ray source irradiating ultraviolet light onto said photocatalytic material;
   a treating tank filled with an absorbing, adsorbing, or neutralizing agent;
   a first path connecting the effluent vaporizing tank and the container; and
   a second path connecting the container and the treating tank;
   wherein said third path is formed using a plurality of direct tube-shaped paths each of which has an inner diameter ranging from 5 mm to 30 mm and a length ranging from 200 mm to 800 mm, adjacent one of said paths being coupled with each other such that all said paths form one flow path.

2. An effluent treating equipment according to claim 1, wherein said photocatalytic granules include photocatalyst particles and inorganic powder, said photocatalyst particles having content ranging from 10 wt % to 95 wt% in said photocatalytic granules.

3. An effluent treating equipment according to claim 2, wherein:

said photocatalyst particles are fine particles of titanium dioxide; and said powder of inorganic substance is at least one selected from a group including calcium silicate, calcium carbonate, sodium carbonate, lime, kaolinite, wallastnite, talc, nepheline, zeolite, and calcium hydroxide.

4. An effluent treating equipment according to claim 1, wherein said direct tube-shaped paths and said at least one ultraviolet ray source are arranged in a perpendicular direction.

5. An effluent treating equipment according to claim 1, wherein said absorbing, adsorbing, and neutralizing agent is in the form of liquid or powder including at least one selected from a group including calcium sulfite, calcium silicate, sodium carbonate, sodium bicarbonate, sodium thiosulfate, calcium carbonate, lime, ammonia, sodium hydroxide, alkaline water, water, and calcium hydroxide.

6. An effluent treating equipment according to claim 1, wherein in part or all of said container, said treating tank, said first path and/or said second path include an inner surface made of polymer.

7. An effluent treating equipment according to claim 1, wherein said effluent vaporizing tank includes:

an aeration tank; or a heating tank.

8. An effluent treating equipment according to claim 7, wherein:

said aeration tank includes:

an effluent inlet for supplying the effluent to an aeration tank;

an effluent outlet for discharging waste fluid after an aeration process;

a compressed air inlet for feeding compressed air; and a vaporized gas outlet for discharging vaporized gas to an optical oxidizing and decomposing section; and an open/close valve, a regulator, a pressure gauge, and a compressed air supply inlet disposed for said compressed air inlet for adjusting an inner pressure of said aeration tank to a value ranging from +0.1 kg/cm$^2$ to +5.0 kg/cm$^2$ relative to an atmospheric pressure, said vaporized gas being discharged by the pressure in said aeration tank from said vaporized gas outlet to said first path.

9. An effluent treating equipment according to claim 1, wherein said photocatalytic material include photocatalytic granules.

10. An effluent treating equipment according to claim 1, wherein said photocatalytic granules having a minimum diameter of 1 mm or more and a maximum diameter of 20 mm or less.

11. An effluent treating equipment according to claim 1, wherein a water separator is connected to said effluent vaporizing tank.

12. An effluent treating equipment according to claim 1, wherein said direct tube-shaped paths and said at least one ultraviolet ray source are arranged in parallel.

13. An effluent treating equipment, comprising:

an effluent vaporizing tank including an aeration tank or a heating tank;

said aeration tank including:

an effluent inlet for supplying the effluent to an aeration tank;

an effluent outlet for discharging waste fluid after an aeration process;

a compressed air inlet for feeding compressed air; and a vaporized gas outlet for discharging vaporized gas to an optical oxidizing and decomposing section; and an open/close valve, a regulator, a pressure gauge, and a compressed air supply inlet disposed for said compressed air inlet for adjusting an inner pressure of said aeration tank to a value ranging from +0.1 kg/cm$^2$ to +5.0 kg/cm$^2$ relative to an atmospheric pressure, said vaporized gas being discharged by the pressure in said aeration tank from said vaporized gas outlet to said first path;

a photocatalytic material put in a container;

at least one ultraviolet ray source irradiating ultraviolet light onto said photocatalytic material;

a treating tank filled with an absorbing, adsorbing, or neutralizing agent;

a first path connecting the effluent vaporizing tank and the container;

a second path connecting the container and the treating tank;

wherein said effluent outlet is coupled via branch valve with a cleaning agent tube coupled with said container, whereby neutral or alkaline aqueous solution for cleaning beforehand filled in said aeration tank being fed to and passed through said container.

14. An effluent treating apparatus according to claim 13, wherein said aeration tank includes an inner surface coated with a fluorine-based resin or a polyethylene-based resin.

15. An effluent treating equipment according to claim 13, wherein said aeration tank includes an effluent stirring apparatus therein.

16. An effluent treating equipment according to claim 13, further comprising an air dispersing tube for said compressed air inlet for feeding compressed air to said aeration tank.

17. An effluent treating equipment according to claim 13, wherein a water separator is connected to said effluent vaporizing tank.

18. A cleaning equipment, comprising:

a cleaner discharging effluent containing chlorine-based organic matter; and an effluent treating apparatus for treating effluent discharge from the cleaner comprises a vaporizing tank, a photocatalytic material put in a container, an ultraviolet ray source irradiating ultra violet light on said photocatalytic material, a treating tank filled with an absorbing or adsorbind agent, a first path connecting an effluent vaporizing tank and the container and a second path connecting the container and the treating tank;

a water separator disposed between said cleaner and said effluent treating equipment for separating effluent from solvent; and a hose for feeding the effluent discharged from said water separator to said effluent vaporizing tank.

* * * * *